United States Patent
Endo et al.

(10) Patent No.: US 9,981,213 B2
(45) Date of Patent: May 29, 2018

(54) AIR CLEANER HOUSING

(71) Applicant: TOYOTA BOSHOKU KABUSHIKI KAISHA, Aichi-ken (JP)

(72) Inventors: Daisuke Endo, Okazaki (JP); Shinya Kato, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 38 days.

(21) Appl. No.: 15/046,992

(22) Filed: Feb. 18, 2016

(65) Prior Publication Data
US 2016/0243484 A1 Aug. 25, 2016

(30) Foreign Application Priority Data

Feb. 23, 2015 (JP) ................................ 2015-033156

(51) Int. Cl.
*B01D 46/10* (2006.01)
*B01D 46/00* (2006.01)

(52) U.S. Cl.
CPC ..... *B01D 46/0005* (2013.01); *B01D 46/0004* (2013.01); *B01D 46/10* (2013.01)

(58) Field of Classification Search
CPC .. B01D 46/0002; B01D 46/10; B01D 46/521; B01D 2271/022; F02M 35/0203
USPC .......... 55/493, 498, 502, 503, 511, DIG. 28, 55/385.3, 495; 96/135; 123/198 E
See application file for complete search history.

(56) References Cited

U.S. PATENT DOCUMENTS

| | | | | |
|---|---|---|---|---|
| 5,569,311 | A * | 10/1996 | Oda | B01D 46/0002 55/493 |
| 8,394,158 | B2 * | 3/2013 | Shimomura | F02M 35/0203 55/385.3 |
| 2007/0209517 | A1 * | 9/2007 | Uemura | B01D 46/0036 96/135 |
| 2012/0047856 | A1 * | 3/2012 | Khami | B01D 46/0002 55/385.3 |
| 2012/0192535 | A1 * | 8/2012 | Schrewe | B01D 46/0005 55/385.3 |

(Continued)

FOREIGN PATENT DOCUMENTS

| | | |
|---|---|---|
| CN | 1115357 | 1/1996 |
| JP | 9-14065 | 1/1997 |
| JP | 4292038 | 7/2009 |

OTHER PUBLICATIONS

Office Action issued in China Counterpart Patent Appl. No. 201610089961.3, dated Jan. 10, 2018.

*Primary Examiner* — Robert A Hopkins
*Assistant Examiner* — Minh-Chau Pham
(74) *Attorney, Agent, or Firm* — Greenblum & Bernstein, P.L.C.

(57) ABSTRACT

An air cleaner housing is provided with a first case including an opening, a second case capable of opening and closing the opening of the first case, a clamp mechanism including a clamp that holds the second case in a state closing the opening of the first case, a filter element arranged between the first case and the second case, and a first closing stopper and a second closing stopper configured to interfere with each other when the second case is displaced from a predetermined position relative to the first case thereby stopping the second case from closing the opening of the first case. The first closing stopper and the second closing stopper are included in the clamp mechanism.

6 Claims, 8 Drawing Sheets

(56) References Cited

U.S. PATENT DOCUMENTS

2015/0007530 A1* 1/2015 Cho ................... F02M 35/0203
55/357

* cited by examiner

AIR CLEANER HOUSING

BACKGROUND ART

The present invention relates to an air cleaner housing that accommodates a filter element, which filters air that is delivered to an engine.

A typical air cleaner housing includes two cases. One of the two cases closes and opens an opening of the other case. A filter element is held between the two cases.

Japanese Laid-Open Patent Publication No. 9-14065 discloses such an air cleaner housing.

The air cleaner housing disclosed in the publication includes a lower case and an upper case, which opens and closes an upper opening of the lower case. A filter element is arranged between the two cases. The upper case is moved along the lower case to couple the upper case to the lower case when assembling the air cleaner housing. The air cleaner housing includes an engagement mechanism to restrict movement of the upper case, after the two cases are coupled to each other, in a direction opposite to the direction the upper case is coupled to the lower case. The engagement mechanism includes ribs, each formed on one of the two side surfaces of the lower case, and plate-shaped projections, each formed on one of the two side surfaces of the upper case. Engagement of the ribs with the projections restricts relative movement of the two cases and keeps the gaps between the filter element and the two cases sealed.

However, in the air cleaner housing disclosed in Japanese Laid-Open Patent Publication No. 9-14065, the engagement mechanism may not be able to keep the gaps sealed between the filter element and the two cases. More specifically, the engagement mechanism functions to restrict relative movement of the two cases after the two cases are coupled to each other. Thus, even when the two cases are displaced from their predetermined positions before the coupling of the two cases is completed, the two cases can be coupled to each other. The coupling of the two cases when displaced from the predetermined positions may result in a shortcoming. More specifically, each projection of the engagement mechanism is plate-shaped and located on the lower edge of the upper case. Thus, when the two cases are displaced, the projections may move beyond the edge of the lower case and enter the lower case. This may squeeze and deform a seal that is located between the two cases around the filter element. In such a case, the seal may fail to function properly. This leads to defective sealing and adversely affects the filtering performance.

With the air cleaner housing of the above publication, when someone closes the upper opening of the lower case with the upper case, that person would have to use a clamp to keep the two cases closed and check that the two cases are clamped together. In addition, there is a need to check the engagement of the ribs and projections of the engagement mechanism. This increases the workload.

SUMMARY OF THE INVENTION

Accordingly, it is an object of the present invention to provide an air cleaner housing that facilitates the closing of the two cases, while limiting defective sealing by restricting coupling of the two cases when the two cases are displaced from the predetermined positions.

To achieve the above object, the present invention provides an air cleaner housing provided with a first case including an opening, a second case capable of opening and closing the opening of the first case, a clamp mechanism including a clamp that holds the second case in a state closing the opening of the first case, a filter element arranged between the first case and the second case, and a first closing stopper and a second closing stopper configured to interfere with each other when the second case is displaced from a predetermined position relative to the first case thereby stopping the second case from closing the opening of the first case. The first closing stopper and the second closing stopper are included in the clamp mechanism.

In the above structure, if the second case is displaced from the predetermined position relative to the first case when closing the opening of the first case, the first and second closing stoppers interfere with each other and stop the second case from closing the opening of the first case. This prevents one of the cases from being displaced relative to the filter element and ensures that gaps are sealed between the filter element and the two cases. Since the first closing stopper and the second closing stopper are included in the clamp mechanism, the first and second closing stoppers share space with the clamp mechanism. This reduces the space occupied by the first and second closing stoppers. Thus, there are fewer limitations to the layout of components around the air cleaner housing in the engine compartment, and the freedom of design may be improved for the engine compartment. Further, since the clamp mechanism includes the first and second closing stoppers, the person that clamps the two cases with the clamp can check whether or not the opening of the first case is closed by the second case when checking the clamping of the clamp mechanism. This facilitates the clamping of the cases.

DETAILED DESCRIPTION OF THE INVENTION

An air cleaner housing according to one embodiment of the present invention will now be described with reference to the drawings.

Figure 1:
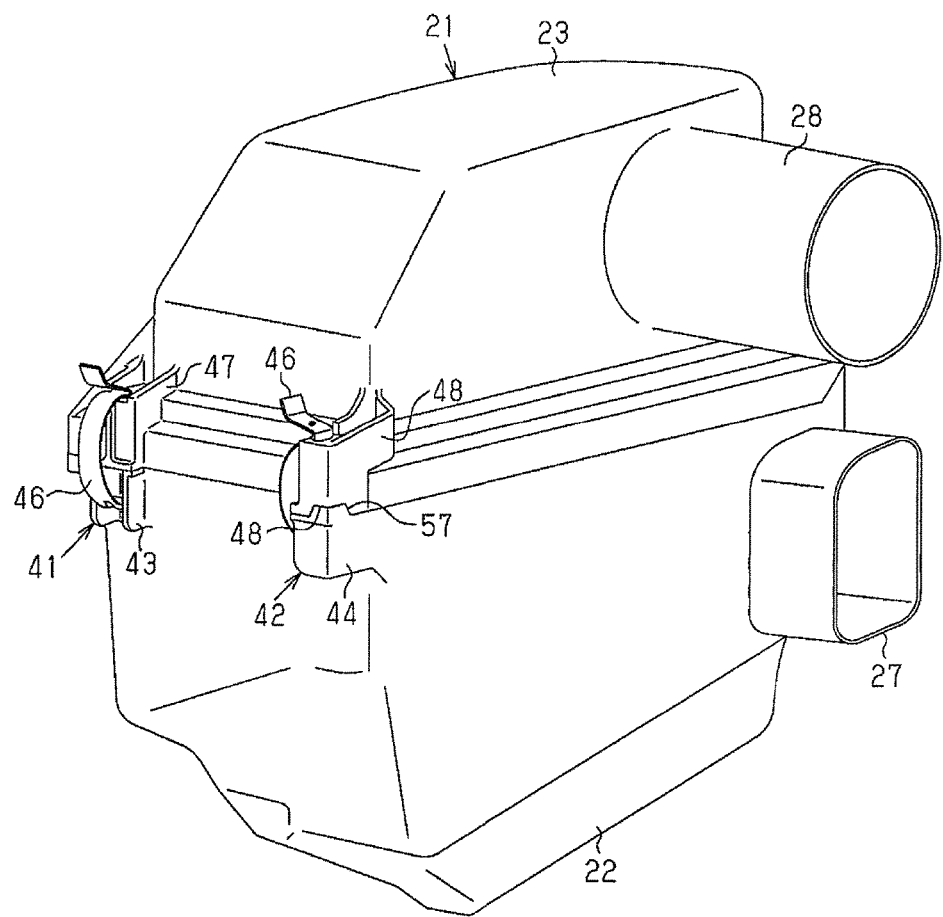
FIG. 1 is a perspective view showing one embodiment of an air cleaner housing in a closed state.
Figure 2:
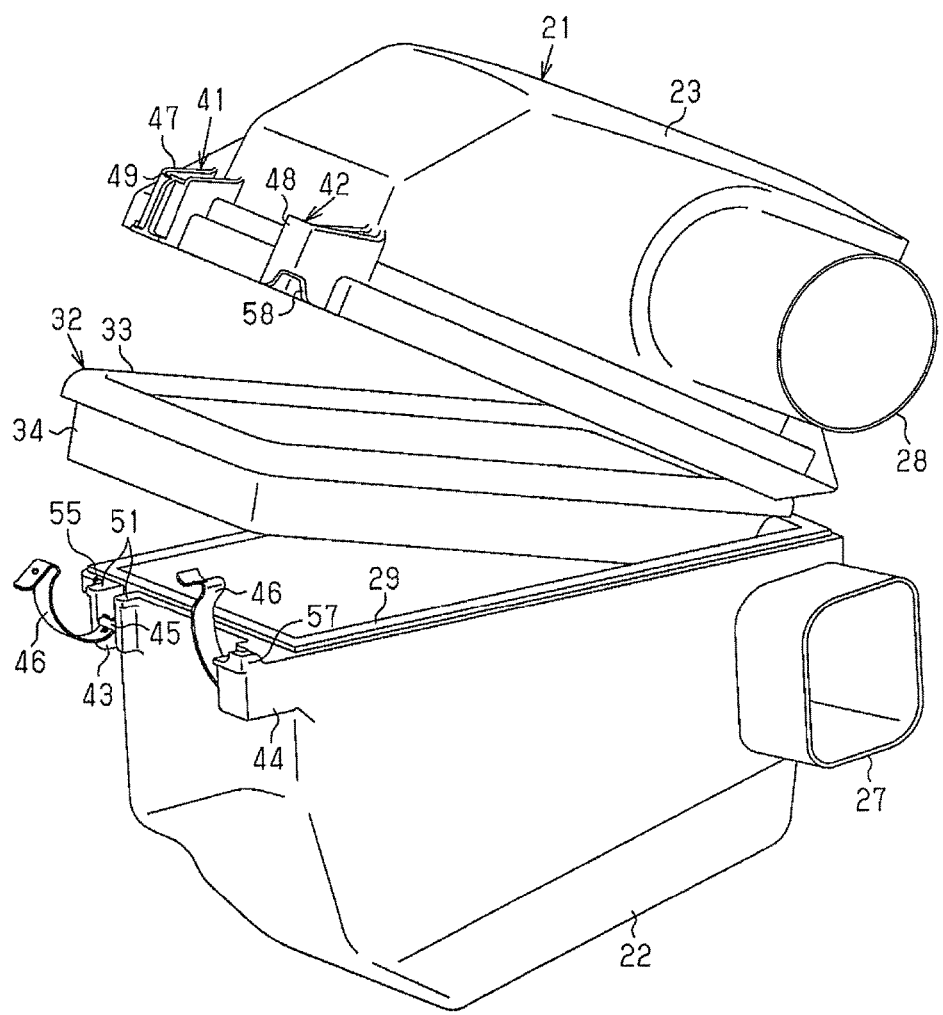
FIG. 2 is a perspective view showing the air cleaner housing of FIG. 1 in an open state.

As shown in FIGS. 1 and 2, an air cleaner housing (hereinafter, referred to as the housing 21) is tetragonal in a plan view and includes a lower case 22 (first case) and an upper case 23 (second case). The lower case 22 is located in an engine compartment of a vehicle. The upper case 23 is coupled to the lower case 22 so that the upper case 23 can open and close an upper opening of the lower case 22.

Figure 3:
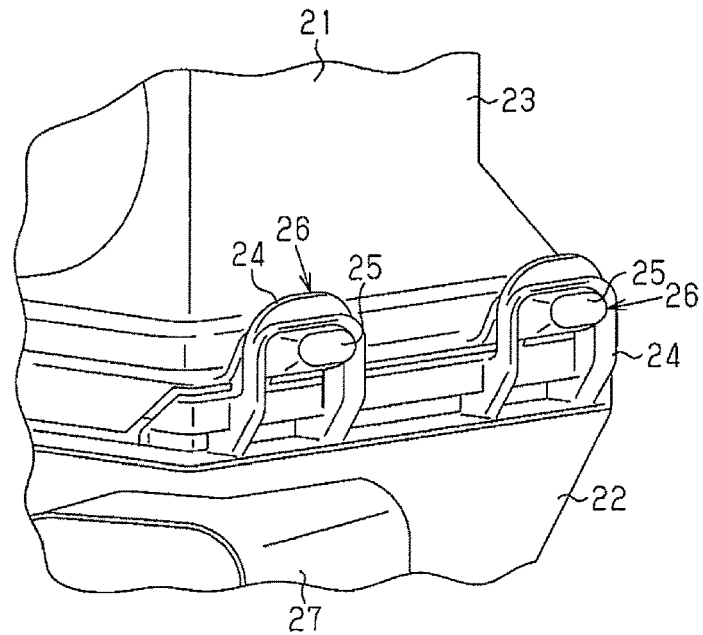
FIG. 3 is a perspective view showing hinges.

As shown in FIG. 3, two U-shaped catches 24 are formed integrally with a rear portion of the lower case 22, and two projections 25 are formed on a rear portion of the upper case 23. The two catches 24 and the two projections 25 form two hinges 26. The upper case 23 is moved on the lower case 22 toward the rear to insert the projections 25 of the upper case 23 into the catches 24 of the lower case 22. To open the upper opening of the lower case 22 as shown in FIG. 2, in a state in which the projections 25 are received in the catches 24, the upper case 23 is pivoted toward the upper side about the hinges 26 from the state shown in FIG. 1. To close the upper opening of the lower case 22 as shown in FIG. 1, the upper case 23 is pivoted toward the lower side from the state shown in FIG. 2.

In the present embodiment, among the four walls surrounding the upper opening of the lower case 22, the wall including the two catches 24 is referred to as the rear wall, the wall opposing the rear wall is referred to as the front wall, and the two walls between the rear wall and the front wall are referred to as the side walls. In the same manner, among the four walls surrounding a lower opening of the upper case 23, the wall including the two projections 25 is referred to as the rear wall, the wall opposing the rear wall is referred to as the front wall, and the two walls between the rear wall and the front wall are referred to as the side walls. The front wall of the lower case 22 and the front wall of the upper case 23 define a front wall of the housing 21. The rear wall of the lower case 22 and the rear wall of the upper case 23 define a rear wall of the housing 21. The two side walls of the lower case 22 and the two side walls of the upper case 23 define two side walls of the housing 21.

Figure 4:
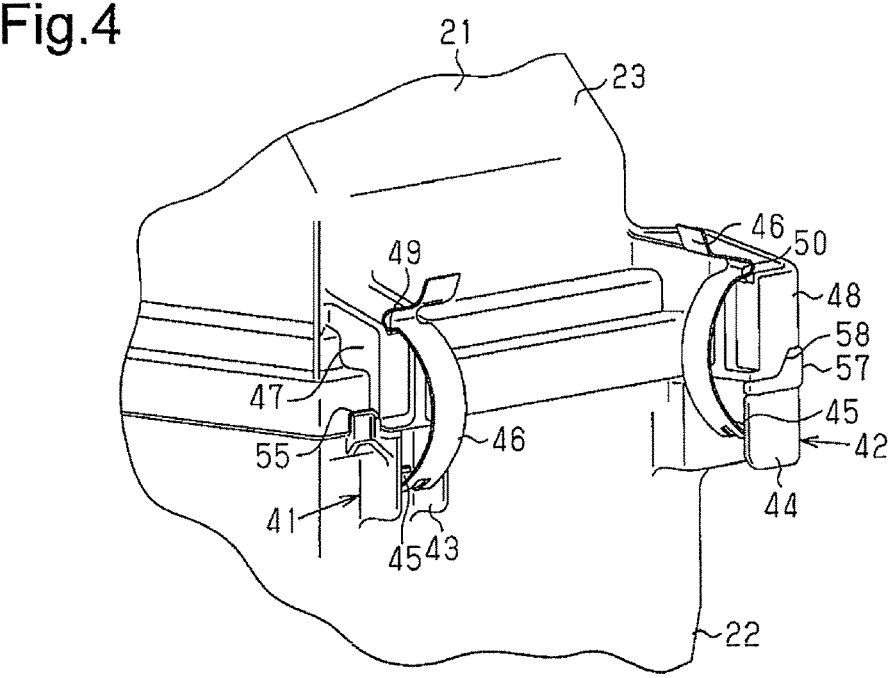
FIG. 4 is a perspective view showing a first clamp mechanism and a second clamp mechanism.
Figure 5:
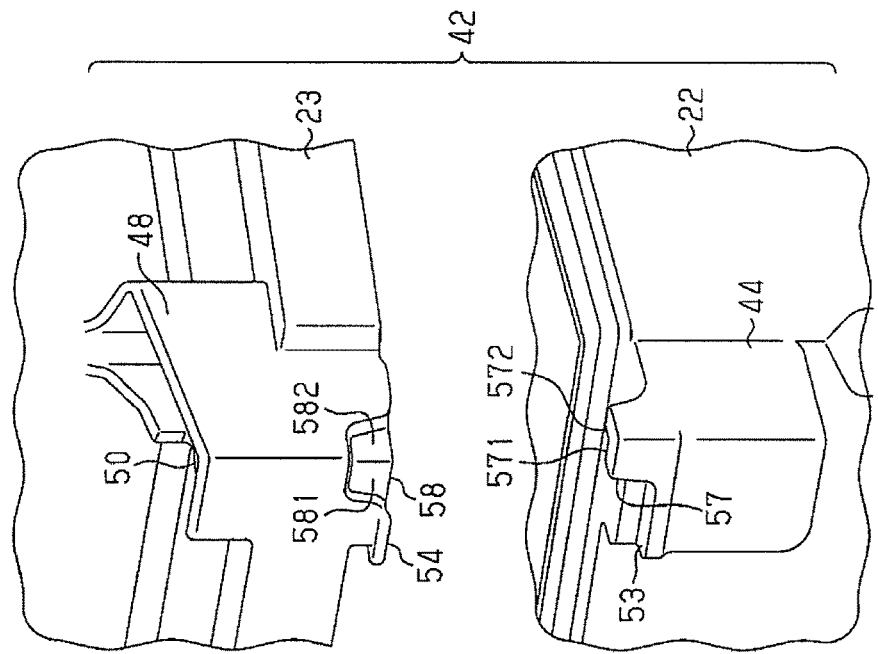
FIG. 5 is a perspective view showing the first clamp mechanism when the air cleaner housing is open.
Figure 6:
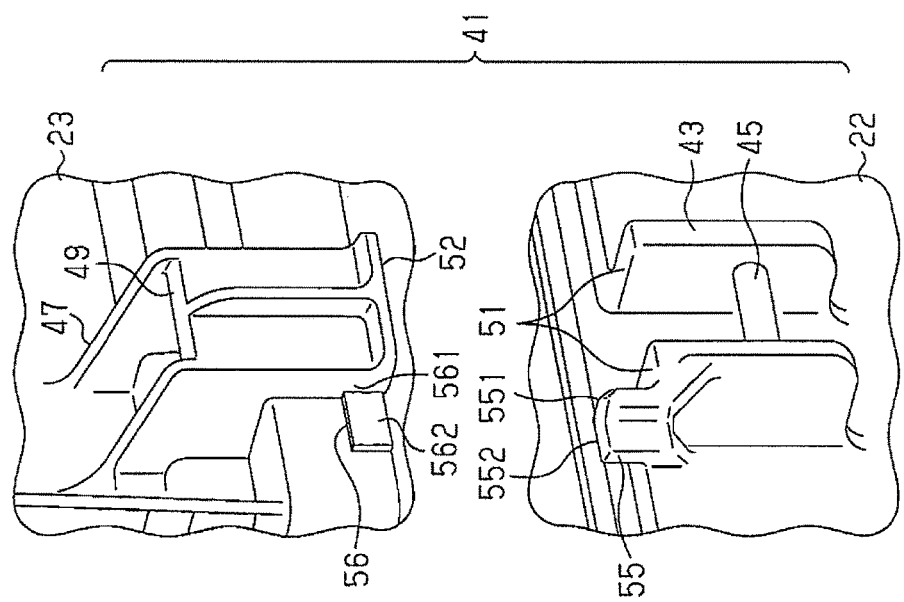
FIG. 6 is a perspective view showing the second clamp mechanism when the air cleaner housing is open.

As shown in FIGS. 4 to 6, the front wall of the housing 21 includes first and second clamp mechanisms 41 and 42. Referring to FIG. 1, the first and second clamp mechanisms 41 and 42 keep the upper case 23 and the lower case 22 closed.

As shown in FIGS. 1 and 2, one of the side walls of the lower case 22 includes an inlet 27. Further, one of the side walls of the upper case 23 includes an outlet 28.

Figure 7:
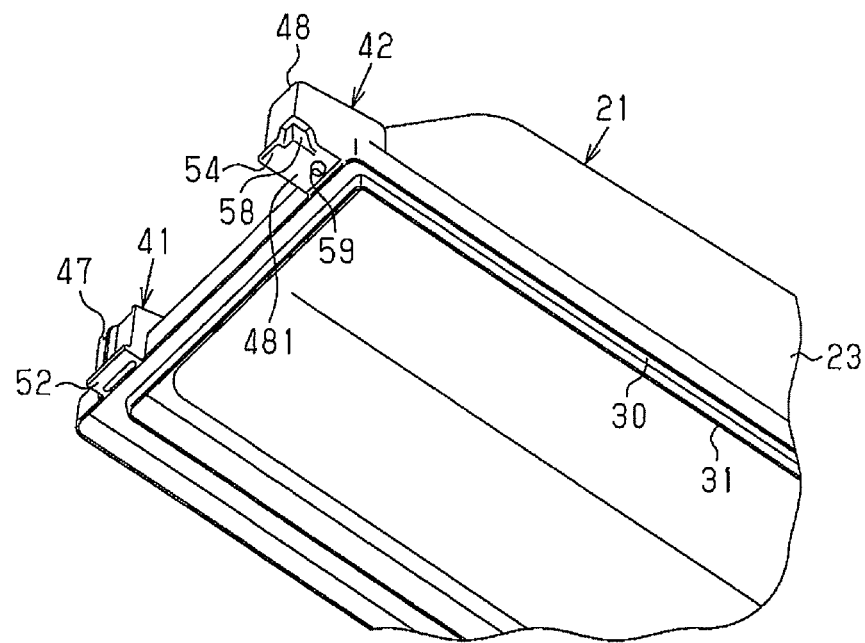
FIG. 7 is an exploded perspective view of the air cleaner housing showing the first clamp mechanism and the second clamp mechanism.
Figure 7:
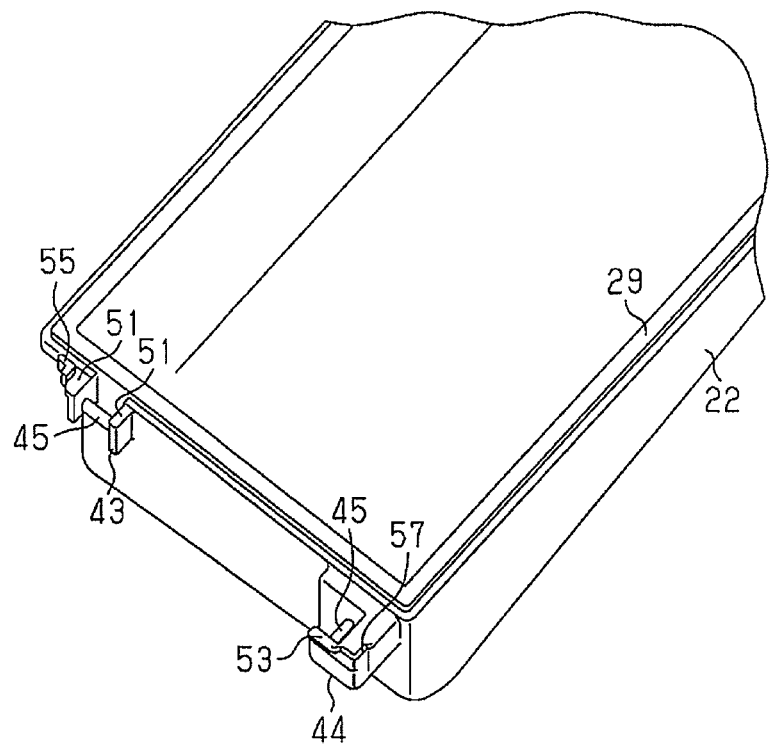
Figure 16:
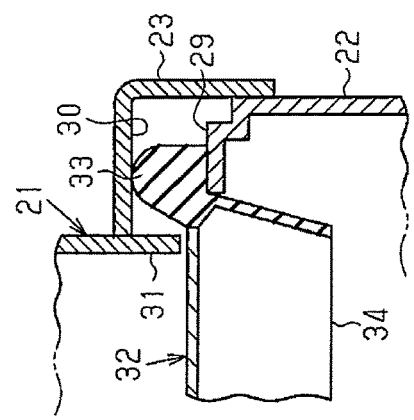
FIG. 16 is a cross-sectional view showing the arrangement of the filter element.

As shown in FIGS. 2 and 7, the lower case 22 includes a tetragonal setting surface 29 extending around the upper opening. The upper case 23 includes a tetragonal pressing surface 30 extending around the lower opening. A lip 31 projects downward from the inner rim of the pressing surface 30. Referring to FIG. 16, the upper case 23 is arranged at a predetermined position relative to the lower case 22 where the upper case 23 closes the upper opening of the lower case 22 when a seal 33, which extends around a filter element 32, is arranged on the setting surface 29 and a filtering portion 34 of the filter element 32 is arranged in the lower case 22. In such a state, the upper case 23 and the lower case 22 are clamped together with the clamp mechanisms 41 and 42. This presses the seal 33 with the pressing surface 30 and arranges the lip 31 at the inner side of the seal 33. Consequently, the filter element 32 is arranged at a predetermined position in the housing 21, that is, between the lower case 22 and the upper case 23.

Air is drawn through the inlet 27 of the lower case 22 into the housing 21 and filtered by the filter element 32. Then, the filtered air is delivered via the outlet 28 of the upper case 23 to an engine (not shown).

The structures of the first and second clamp mechanisms 41 and 42 will now be described.

As shown in FIGS. 1, 2, and 4, the first clamp mechanism 41 includes a lower clamp seat 43 (first clamp seat), which is formed on the lower case 22, and an upper clamp seat 47 (second clamp seat), which is formed on the upper case 23. The second clamp mechanism 42 includes a lower clamp seat 44 (first clamp seat), which is formed on the lower case 22, and an upper clamp seat 48 (second clamp seat), which is formed on the upper case 23. The lower clamp seats 43 and 44 each include a rod 45 and a clamp 46, which is supported pivotally about the rod 45. The upper clamp seats 47 and 48 include hooks 49 and 50. The two clamps 46 are attached in a removable manner to the hooks 49 and 50, respectively. The two clamps 46 are pressed against the hooks 49 and 50 to clamp the lower case 22 and the upper case 23. This holds the seal 33 of the filter element 32 between the upper case 23 and the lower case 22 and fixes the upper case 23 to the lower case 22.

As shown in FIGS. 5 and 7, the lower clamp seat 43 of the first clamp mechanism 41 includes an upper surface that defines first pressing surfaces 51. The upper clamp seat 47 of the first clamp mechanism 41 includes a lower surface that defines a second pressing surface 52, which is opposed to the first pressing surfaces 51 of the lower clamp seat 43 in the vertical direction. As shown in FIGS. 6 and 7, the lower clamp seat 44 of the second clamp mechanism 42 includes an upper surface that defines a first pressing surface 53. The upper clamp seat 48 of the second clamp mechanism 42 includes a lower surface that defines a second pressing surface 54, which is opposed to the first pressing surface 53 of the lower clamp seat 44 in the vertical direction. When the clamps 46 clamp the lower case 22 and the upper case 23, the clamping force of the clamps 46 presses the second pressing surfaces 52 and 54 of the upper clamp seats 47 and 48 against the first pressing surfaces 51 and 53 of the lower clamp seats 43 and 44. This holds the two cases 22 and 23 at predetermined relative positions.

Figure 11:
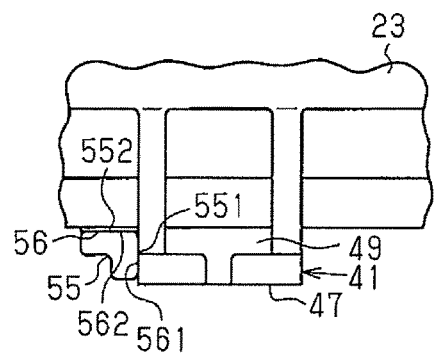
FIG. 11 is a plan view showing the first clamp mechanism when the upper case is not displaced.

As shown in FIGS. 4, 5, and 11, an engagement projection 55 (first closing stopper) is formed integrally with the lower case 22 between the lower clamp seat 43 of the first clamp mechanism 41 and the front wall of the lower case 22. The engagement projection 55 projects further upward from the setting surface 29. The engagement projection 55 includes a first surface 551 (first engagement surface) and a second surface 552 (first engagement surface), which is orthogonal to the first surface 551 in a plan view. The upper case 23 includes an engagement recess 56 between the upper clamp seat 47 of the first clamp mechanism 41 and the front wall of the upper case 23. The engagement recess 56 is defined by a third surface 561 (second engagement surface), which is located on a side surface of the upper clamp seat 47, and a fourth surface 562 (second engagement surface), which is located on the front surface of the upper case 23 and orthogonal to the third surface 561 in a plan view. When the upper case 23 closes the upper opening of the lower case 22, the first surface 551 and the second surface 552 of the engagement projection 55 are respectively engaged with the third surface 561 and the fourth surface 562 of the engagement recess 56.

As shown in FIGS. 6 and 7, an engagement projection 57 (first closing stopper) is formed integrally with the lower clamp seat 44 of the second clamp mechanism 42, that is, the lower case 22. The engagement projection 57 includes a first surface 571 (first engagement surface) and a second surface 572 (first engagement surface), which is orthogonal to the first surface 571 in a plan view. The engagement projection 57 projects further upward from the setting surface 29. The upper clamp seat 48 of the second clamp mechanism 42 includes an engagement recess 58 defined by a third surface 581 (second engagement surface) and a fourth surface 582 (second engagement surface), which is orthogonal to the third surface 581 in a plan view. When the upper case 23 closes the upper opening of the lower case 22, the first surface 571 and the second surface 572 of the engagement projection 57 are respectively engaged with the third surface 581 and the fourth surface 582 of the engagement recess 58.

The upper clamp seat 48 of the second clamp mechanism 42 includes a bottom wall 481. A drain hole 59 extends through the bottom wall 481.

The operation of the present embodiment will now be described.

As shown in FIG. 16, to place the filter element 32 in the housing 21, the lower case 22 and the upper case 23 are released from the clamps 46 and unclamped. Then, the upper case 23 is pivoted toward the upper side and moved toward the front to remove the projections 25 of the hinges 26 from the catches 24 and separate the upper case 23 from the lower case 22.

This opens the upper opening of the lower case 22. The filter element 32 is placed in the upper opening. More specifically, the filtering portion 34 of the filter element 32 is arranged in the lower case 22, and the seal 33 is arranged on the setting surface 29 of the lower case 22.

Then, the projections 25 of the upper case 23 are fitted into the catches 24 of the lower case 22, and the upper case 23 is pivoted toward the lower side about the hinges 26. That is, the upper case 23 is pivoted and closed. This closes the upper opening of the lower case 22 with the upper case 23 and holds the filter element 32 between the two cases 22 and 23. In this state, the clamps 46 of the first clamp mechanism 41 and the second clamp mechanism 42 are hooked to the hooks 49 and 50 of the upper clamp seats 47 and 48. This fixes the upper case 23 to the lower case 22 with the upper opening of the lower case 22 closed by the upper case 23.

Figure 9:
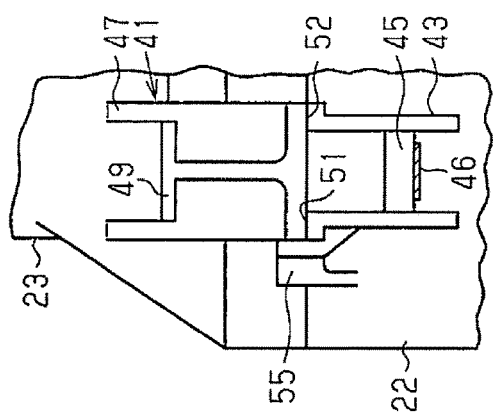
FIG. 9 is a front view of the first clamp mechanism.

Here, the clamping force of the first clamp mechanism 41 presses the first pressing surface 51 of the lower case 22 and the second pressing surface 52 of the upper case 23 against each other. That is, the first and second pressing surfaces 51 and 52 receive the clamping force. Before the first and second pressing surfaces 51 and 52 are pressed against each other, the engagement projection 55 of the lower case 22 that projects toward the upper side as shown in FIGS. 4, 5, and 9 is engaged with the engagement recess 56 of the upper case 23. More specifically, the first surface 551 and the second surface 552 of the engagement projection 55 are respectively engaged with the third surface 561 and the fourth surface 562 of the engagement recess 56.

Further, the clamping force of the second clamp mechanism 42 presses the first pressing surface 53 of the lower case 22 and the second pressing surface 54 of the upper case 23 against each other. That is, the first and second pressing surface 53 and 54 receive the clamping force. Before the first and second pressing surfaces 53 and 54 are pressed against each other, the engagement projection 57 of the lower case 22 that projects toward the upper side as shown in FIGS. 4 and 6 is engaged with the engagement recess 58 of the upper case 23. More specifically, the first surface 571 and the second surface 572 of the engagement projection 57 are respectively engaged with the third surface 581 and the fourth surface 582 of the engagement recess 58.

In this manner, the first and second surfaces 551 and 552 (first engagement surfaces) of the engagement projection 55 are respectively engaged with the third and fourth surfaces 561 and 562 (second engagement surfaces) of the engagement recess 56 in the first clamp mechanism 41, and the first and second surfaces 571 and 572 (first engagement surfaces) of the engagement projection 57 are respectively engaged with the third and fourth surfaces 581 and 582 (second engagement surfaces) of the engagement recess 58 in the second clamp mechanism 42. The angle between the first surface 551 and the second surface 552 of the engagement projection 55 is set to 90 degrees in a plan view, and the angle between the first surface 571 and the second surface 572 of the engagement projection 57 is set to 90 degrees in a plan view. The angle between the third surface 561 and the fourth surface 562 of the engagement recess 56 is set to 90 degrees in a plan view, and the angle between the third surface 581 and the fourth surface 582 of the engagement recess 58 is set to 90 degrees in a plan view. This fixes the upper case 23 to the lower case 22 at the predetermined position relative to the lower case 22, and the upper case 23 is not displaced toward the front, rear, left, and right of the lower case 22. Thus, the filter element 32 functions to effectively perform filtering in the desired manner. Further, the upper case 23 closes the upper opening of the lower case 22 at the predetermined position relative to the lower case 22, and the filter element 32 is properly held between the upper case 23 and the lower case 22. When the upper case 23 is located at the predetermined position relative to the lower case 22, the lower case 22 and the upper case 23 are located at correct positions.

The upper case 23 may be displaced or act to be displaced from the predetermined position relative to the lower case 22 when pivoting and closing the upper case 23. However, such displacement is restricted as described below.

Figure 12:
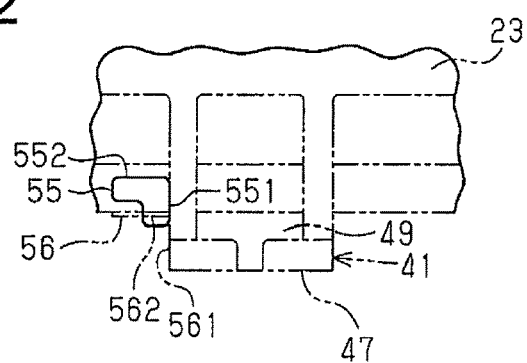
FIG. 12 is a plan view showing the first clamp mechanism when the upper case is displaced toward the front.
Figure 13:
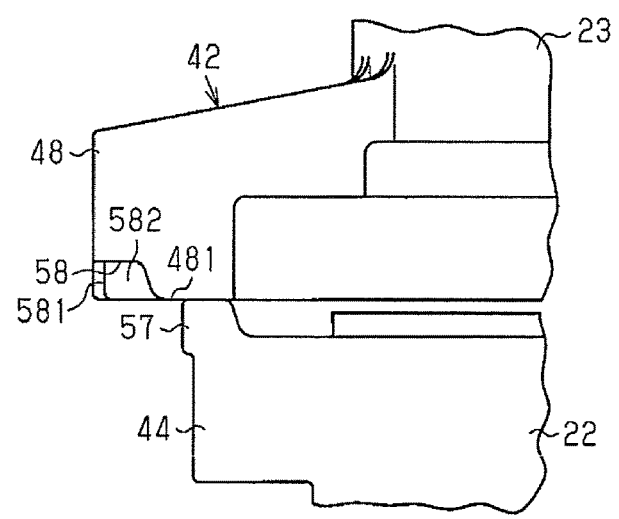
FIG. 13 is a side view showing the second clamp mechanism when the upper case is displaced toward the front.
Figure 15:
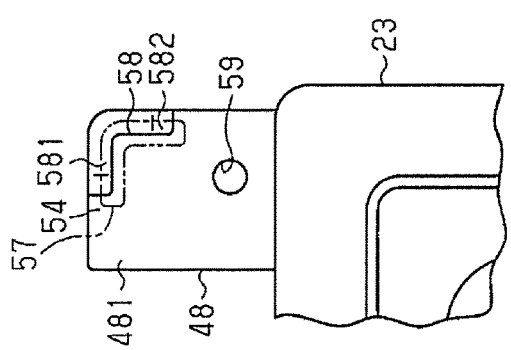
FIG. 15 is a bottom view showing the second clamp mechanism when the upper case is displaced.

Referring to FIG. 12, if the upper case 23 is displaced toward the front from the predetermined position relative to the lower case 22 when closing the upper opening of the lower case 22, the engagement projection 55 of the first clamp mechanism 41 interferes with the rim of the upper case 23 around the lower opening. Further, as shown in FIGS. 13 and 15, the engagement projection 57 of the second clamp mechanism 42 interferes with the bottom wall 481 of the upper clamp seat 48. This stops the upper case 23 from closing the upper opening of the lower case 22. Accordingly, the rim of the upper case 23 around the lower opening and the bottom wall 481 each function as an interfered portion (second closing stopper).

Figure 8:
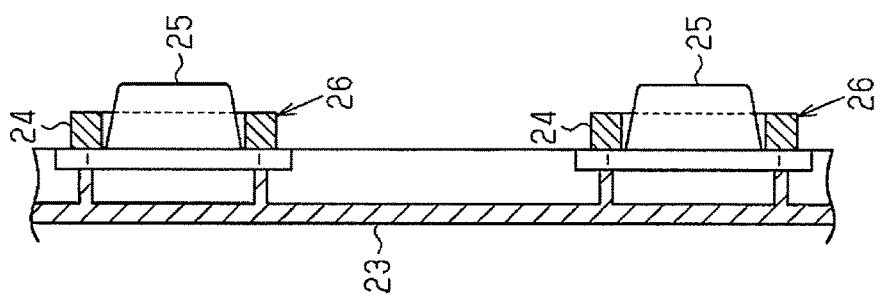
FIG. 8 is a cross-sectional view of the hinges shown in FIG. 3.

Referring to FIG. 8, when the upper case 23 is displaced toward the rear from the predetermined position relative to the lower case 22, the rear wall of the upper case 23 abuts against the front surfaces of the catches 24 of the hinges 26. This stops further movement of the upper case 23 toward the rear and restricts rearward displacement of the upper case 23.

Figure 10:
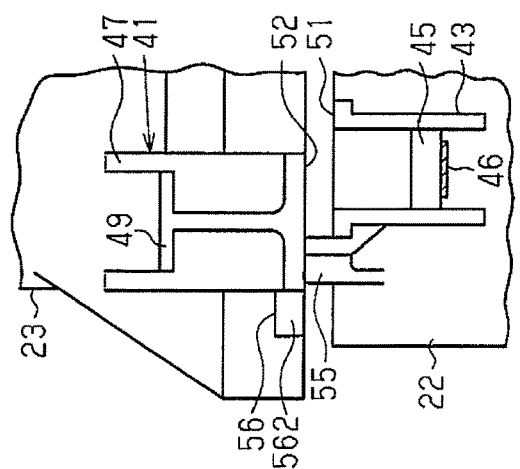
FIG. 10 is a front view showing the first clamp mechanism when an upper case is displaced toward the left.

If the upper case 23 is displaced toward the left from the predetermined position relative to the lower case 22 as viewed in FIG. 9 when closing the upper opening of the lower case 22, the engagement projection 55 of the first clamp mechanism 41 interferes with the second pressing surface 52 of the upper clamp seat 47 as shown in FIG. 10. This stops the upper case 23 from closing the upper opening of the lower case 22. Accordingly, the second pressing surface 52 functions as an interfered portion (second closing stopper).

Figure 14:
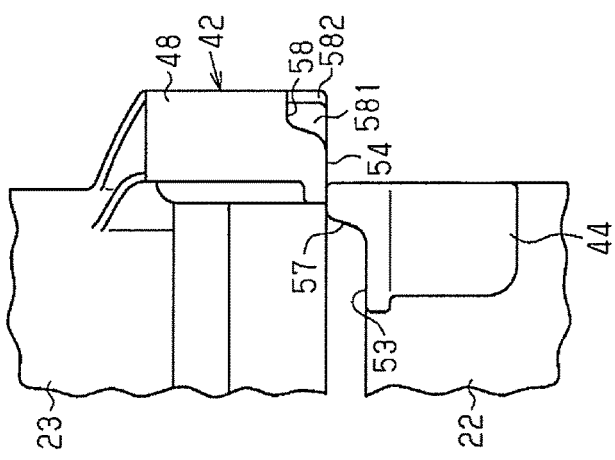
FIG. 14 is a front view showing the second clamp mechanism when the upper case is displaced toward the right.

If the upper case 23 is displaced toward the right from the predetermined position relative to the lower case 22 as viewed in FIG. 9 when closing the upper opening of the lower case 22, the engagement projection 57 of the second clamp mechanism 42 interferes with the second pressing surface 54 and the bottom wall 481 of the upper clamp seat 48 as shown in FIGS. 14 and 15. This stops the upper case 23 from closing the upper opening of the lower case 22. Accordingly, the second pressing surface 54 and the bottom wall 481 each function as an interfered portion (second closing stopper).

As described above, displacement of the upper case 23 toward the rear from the predetermined position relative to the lower case 22 is restricted when closing the upper opening of the lower case 22. If the upper case 23 is displaced from the predetermined position relative to the lower case 22 toward the front, left, or right of the lower case 22 or in a diagonal direction when closing the upper opening of the lower case 22, at least one of the engagement projections 55 and 57 interferes with the corresponding interfered portion in accordance with the direction of displacement. This stops the upper case 23 from closing the upper opening of the lower case 22.

The present embodiment has the advantages described below.

(1) If the upper case 23 is displaced from the predetermined position relative to the lower case 22 when the upper case 23 is closing the upper opening of the lower case 22, the engagement projections 55 and 57 of the lower case 22 interfere with the upper case 23 or the upper clamp seats 47 and 48. Thus, the upper case 23 is stopped from closing the upper opening of the lower case 22 if displaced from the predetermined position relative to the lower case 22. This limits defective sealing of the filter element 32 thereby allowing the filter element 32 to perform filtering in a desired manner.

(2) If the upper case 23 is displaced from the predetermined position relative to the lower case 22 toward the front, left, or right of the lower case 22 or in a diagonal direction when closing the upper opening of the lower case 22, the engagement projections 55 and 57 of the lower case 22 and the interfered portions of the upper case 23 (rim around lower opening, bottom wall 481, and second pressing surfaces 52 and 54) stop the upper case 23 from closing the upper opening of the lower case 22. The engagement projections 55 and 57 are formed integrally with the lower case 22. This limits defective sealing of the filter element 32 without increasing the number of components and allows the structure to be simplified.

(3) The clamp seats 43, 44, 47, and 48 of the clamp mechanisms 41 and 42 include the engagement projections 55 and 57 and the interfered portions. This decreases the space occupied by the engagement projections 55 and 57 and the interfered portions. Thus, there are fewer limitations to the layout of components around the housing 21 in the engine compartment, and the freedom of design is improved for the engine compartment. Further, since the clamp mechanisms 41 and 42 include the engagement projections 55 and 57 and the interfered portions, the person that clamps the upper case 23 and the lower case 22 with the clamps 46 can easily check whether or not the upper opening of the lower case 22 is closed by the upper case 23. This simplifies the clamping of the upper case 23 and the lower case 22.

(4) When the upper case 23 is arranged at the predetermined position relative to the lower case 22, the engagement projections 55 and 57, which are included in the lower clamp seats 43 and 44 of the lower case 22, are engaged with the engagement recesses 56 and 58, which are included in the upper clamp seats 47 and 48 of the upper case 23, to close the upper opening of the lower case 22 with the upper case 23. This correctly positions the lower case 22 and the upper case 23. The engagement of the first engagement surfaces of the engagement projections 55 and 57 with the second engagement surfaces of the engagement recesses 56 and 58 hold the lower case 22 and the upper case 23 at the correct positions. This holds the upper case 23 at the correct and predetermined position relative to the lower case 22 in cooperation with the clamping function of the clamps 46 so that the filter element 32 functions to perform filtering in the desired manner.

The present invention is not limited to the above embodiment and may be embodied in the form described below.

The arrangement of the engagement projections 55 and 57 and the engagement recesses 56 and 58 of the clamp mechanisms 41 and 42 may be reversed upside down from the above embodiment. That is, the engagement projections 55 and 57 may be located on the upper case 23, and the engagement recesses 56 and 58 may be located on the lower case 22.

The invention claimed is:

1. An air cleaner housing comprising:
a first case including an opening;
a second case configured to open and close the opening of the first case;
a clamp mechanism including a clamp that holds the second case in a state closing the opening of the first case, and a first closing stopper and a second closing stopper configured to interfere with each other when the second case is displaced from a predetermined position relative to the first case thereby stopping the second case from closing the opening of the first case; and
a filter element arranged between the first case and the second case, wherein
the clamp mechanism includes a first clamp seat, which supports the clamp, and a second clamp seat, which hooks the clamp when the opening of the first case is closed by the second case,
the first clamp seat is formed on one of the first and second cases,
the second clamp seat is formed on the other one of the first and second cases,
the first closing stopper includes a projection projecting from one of the first and second clamp seats,
the second closing stopper includes an interfered portion located on the other one of the first and second clamp seats, and
the projection interferes with the interfered portion when the second case is displaced from the predetermined position and stops the second case from closing the opening of the first case.

2. The air cleaner housing according to claim 1, wherein
the first case and the second case are located at correct positions when the opening of the first case is closed by the second case with the second case located at the predetermined position, and
the clamp mechanism functions to hold the first case and the second case at the correct positions.

3. The air cleaner housing according to claim 2, wherein
one of the first and second clamp seats, which does not have the projection, has a recess, and
the projection is engaged with the recess when the first case and the second case are located at the correct positions.

4. The air cleaner according to claim 3, wherein
the projection includes first engagement surfaces, and
the recess includes second engagement surfaces engaged with the first engagement surfaces.

5. The air cleaner according to claim 4, wherein
the first engagement surfaces include a first surface and a second surface orthogonal to the first surface.

6. The air cleaner according to claim 5, wherein
the second engagement surfaces include a third surface and a fourth surface orthogonal to the third surface, and
the first surface and the second surface of the projection engage the third surface and the fourth surface of the recess, respectively, when the second case closes the opening of the first case.

* * * * *